(12) United States Patent
Miller

(10) Patent No.: US 9,503,320 B2
(45) Date of Patent: Nov. 22, 2016

(54) OPERATION IMAGE MANAGER

(71) Applicant: Hewlett-Packard Development Company, L.P., Houston, TX (US)

(72) Inventor: Eric Miller, Gilbertsville, PA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 270 days.

(21) Appl. No.: 13/953,903

(22) Filed: Jul. 30, 2013

(65) Prior Publication Data

US 2015/0040014 A1    Feb. 5, 2015

(51) Int. Cl.
   *G06F 3/048*    (2013.01)
   *H04L 12/24*    (2006.01)
   *G06F 9/44*     (2006.01)

(52) U.S. Cl.
   CPC ......... *H04L 41/0803* (2013.01); *G06F 9/4406* (2013.01); *G06F 9/4416* (2013.01); *H04L 41/0876* (2013.01); *H04L 41/082* (2013.01)

(58) Field of Classification Search
   CPC ............................. G06F 9/4406; G06F 9/4416
   See application file for complete search history.

(56) References Cited

U.S. PATENT DOCUMENTS

| | | | | |
|---|---|---|---|---|
| 6,785,808 | B2 * | 8/2004 | Huntington | G06F 9/4406 710/10 |
| 7,017,039 | B2 * | 3/2006 | Hensley | G06F 9/4406 713/1 |
| 7,802,084 | B2 * | 9/2010 | Fitzgerald | G06F 8/63 709/222 |
| 8,145,053 | B2 * | 3/2012 | Sakurai | 396/301 |
| 8,356,084 | B2 * | 1/2013 | Yamamoto | G06F 3/1454 709/217 |
| 8,762,540 | B2 * | 6/2014 | Hochmuth | H04L 67/125 709/227 |
| 2004/0267716 | A1 * | 12/2004 | Prabu et al. | 707/3 |
| 2005/0044548 | A1 * | 2/2005 | Page | G06F 8/63 718/100 |
| 2006/0131388 | A1 * | 6/2006 | Brodin | 235/380 |
| 2006/0179295 | A1 * | 8/2006 | Lu et al. | 713/2 |

(Continued)

FOREIGN PATENT DOCUMENTS

GB    WO-2008/132032 A1    11/2008

OTHER PUBLICATIONS

Compact 7 Getting Started Part-9: Deploy OS Image to Target Device by Samuel Phung as available at http://embedded101.com/ on or before Sep. 21, 2012 (Phung).*

(Continued)

*Primary Examiner* — William Bashore
*Assistant Examiner* — Nathan Shrewsbury
(74) *Attorney, Agent, or Firm* — HP Inc. Patent Department

(57) ABSTRACT

An example method for managing an operation image in an embedded computer in accordance with aspects of the present disclosure includes prompting input related to the operation image associated with the embedded computer. If the input is detected within a predetermined period of time, the method includes customizing the operation image based on the input from the user, and if the input is not detected within the predetermined period of time, the method includes proceeding with a predetermined selection.

18 Claims, 3 Drawing Sheets

(56) References Cited

U.S. PATENT DOCUMENTS

| | | | |
|---|---|---|---|
| 2006/0293907 A1* | 12/2006 | Castineiras | G06Q 30/02 705/1.1 |
| 2008/0270583 A1* | 10/2008 | Gonzalez | G06F 8/61 709/222 |
| 2009/0199212 A1* | 8/2009 | Schneider | G06Q 10/06 719/318 |
| 2009/0237728 A1* | 9/2009 | Yamamoto | 358/1.15 |
| 2010/0077019 A1* | 3/2010 | Holk | H04L 67/125 709/203 |
| 2010/0321527 A1* | 12/2010 | van Schalkwyk | H04N 1/00132 348/231.2 |
| 2011/0119434 A1* | 5/2011 | Brown | G06F 8/65 711/103 |
| 2011/0125996 A1 | 5/2011 | Gattegno et al. | |
| 2011/0185164 A1* | 7/2011 | Okano | 713/2 |
| 2012/0197972 A1 | 8/2012 | Tukol et al. | |
| 2012/0198218 A1 | 8/2012 | Tukol et al. | |
| 2012/0198344 A1* | 8/2012 | Tukol et al. | 715/735 |
| 2013/0054426 A1 | 2/2013 | Rowland et al. | |
| 2014/0108774 A1* | 4/2014 | Bennah | G06F 8/60 713/2 |
| 2014/0108779 A1* | 4/2014 | Bennah | G06F 8/60 713/100 |
| 2014/0156778 A1* | 6/2014 | Luxenberg | H04L 67/2842 709/213 |
| 2014/0267794 A1* | 9/2014 | Carrion | H04N 1/00143 348/207.1 |
| 2014/0331147 A1* | 11/2014 | Jain | G06F 3/0484 715/745 |
| 2014/0341482 A1* | 11/2014 | Murphy-Chutorian | G06K 9/00677 382/284 |

OTHER PUBLICATIONS

Fedora project available at https://fedoraproject.org/wiki/Features/TimeZoneAndLocation on or before Aug. 13, 2008 (Fedora).*

Kushal Koolwal, "Implications of Migrating to Windows Embedded Standard 7 (WES7) in Embedded Applications," Oct. 29, 2011, pp. 1-10, VersaLogic Corporation, Available at:<versalogic.com/downloads/whitepapers/vl_wp_wes7_migration.pdf>.

* cited by examiner

OPERATION IMAGE MANAGER

BACKGROUND

A thin client is a computer or a computer program which depends heavily on some other computer (e.g., its server) to fulfill its computational roles. The notion of a thin client extends directly to any client-server architecture, in which case, a thin client application is one which relies on its server to process most or all of its business logic. The specific roles assumed by the server may vary, from providing data persistence (e.g., for diskless nodes) to actual information processing on the client's behalf. A thin client is a box that allows a user to connect to the network and use enterprise versions of applications that use data that sits on a server without having to store the enterprise applications on the device itself. For example, thin clients allow for local printing, audio and serial device support. Web browsing, terminal emulation and can combine local processing with network computing.

A thin client may be built with Windows Embedded Standard. Windows Embedded Standard 8 (WES8) is a product of embedded operating systems. Specifically, Windows Embedded Standard 7 and WES8 are the successors to WES2009, which in turn was the successor to Windows XP Embedded (XPe). Thin clients with WES8 offer security, desktop management, and work productivity without compromising user experience.

The thin clients include factory-defined administrator account and may have a single image installed in it from the factory. For example, the keyboard language options may be preset at the factory. In addition, the default for the WES-based thin client is automatic logon of the locked-down user account. Enabling automatic logon bypasses the log on to Windows dialog box.

BRIEF DESCRIPTION OF THE DRAWINGS

Example implementations are described in the following detailed description and in reference to the drawings, in which.

DETAILED DESCRIPTION

Various implementations described herein are directed to managing thin clients. More specifically, and as described in greater detail below, various aspects of the present disclosure are directed to a manner by which the configuration management of a thin client is achieved via customizations in the operating system image, which may be pulled and then deployed.

Aspects of the present disclosure described herein utilize a configuration manager for user specific profile configurations in thin client devices. According to various aspects of the present disclosure, the approach provides customization of client images, which allows a common workstation image to be configured. Further, this approach may allow customization while allowing remote connectivity to business information and software and reducing requirements on bandwidth and processing power. Such aspects, among other things, allow for the user to have a completely personal experience on a thin client and lead to an enjoyable experience.

Moreover, the present thin client architecture allows for deployment of less expensive hardware while giving users the applications and tools in a format that reduces management and hardware costs while increasing security.

In one example in accordance with the present disclosure, a method for controlling a display timer of a device is provided. The method comprises prompting input related to the operation image associated with the embedded computer. If the input is detected within a predetermined period of time, the method includes customizing the operation image based on the input from the user, and if the input is not detected within the predetermined period of time, the method includes proceeding with a predetermined selection.

In another example in accordance with the present disclosure, a system is provided. The system comprises a timer, and a processing unit communicatively coupled to the timer to prompt input related to the operation image associated with the user, if the input is detected within a predetermined period of time, customize the operation image based on the input from the user, and if the input is not detected within the predetermined period of time, proceed with a predetermined selection.

In a further example in accordance with the present disclosure, a non-transitory computer-readable medium is provided. The non-transitory computer-readable medium comprises instructions that when executed cause a device to (i) obtain a timer reading when an input from a user is received, the input being related to an operation image of the system, (ii) compare the timer reading to a threshold value, and (iii) perform an action on the operation image based on the comparison.

Figure 1:
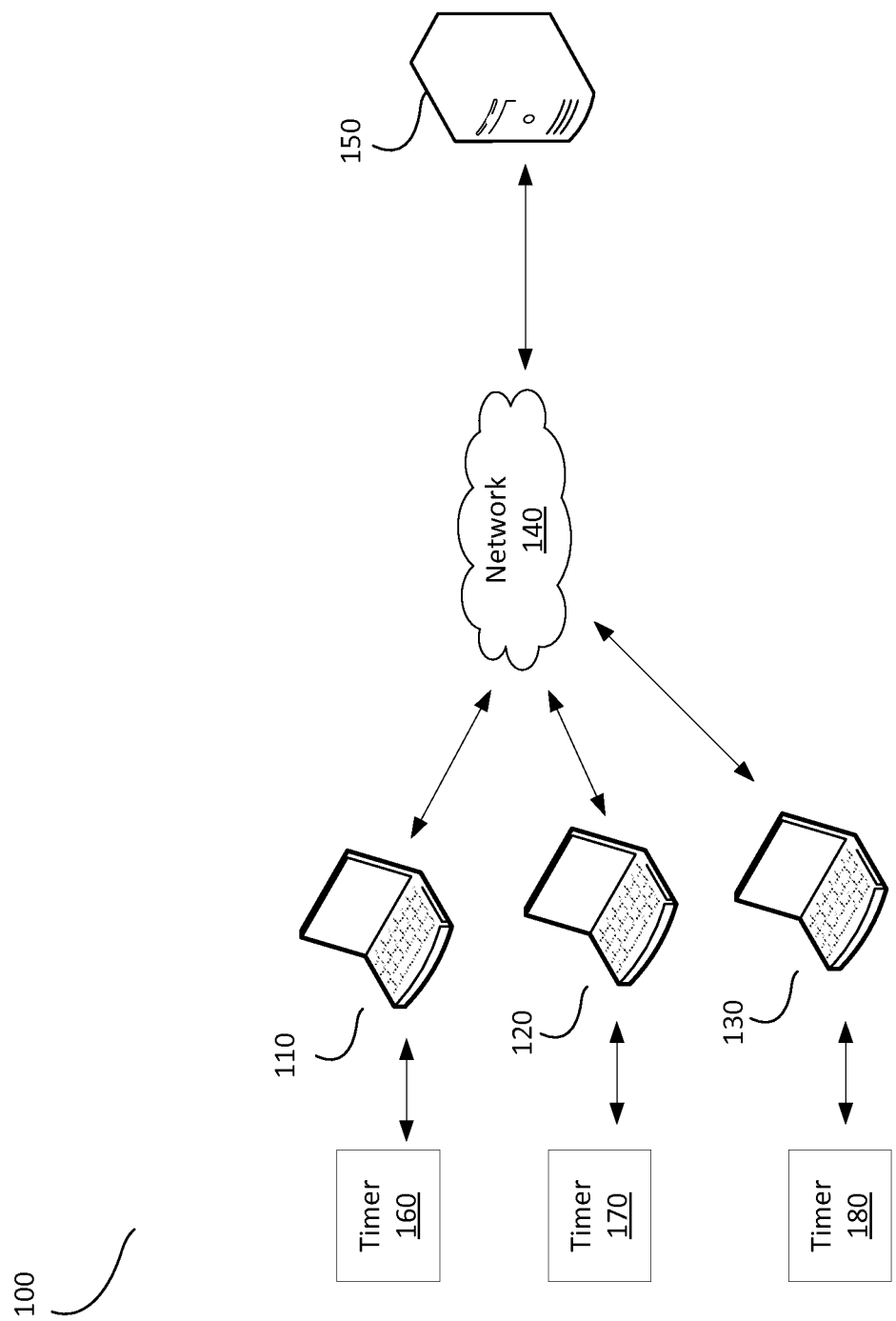
FIG. 1 illustrates example components of an example system in accordance with an implementation.

FIG. 1 illustrates example components of the system 100 in accordance with an implementation. It should be readily apparent that the system 100 illustrated in FIG. 1 represents a generalized depiction and that other components may be added or existing components may be removed, modified, or rearranged without departing from a scope of the present disclosure. The system 100 comprises thin client devices 110, 120 and 130, a network 140 and a server 150, each of which is described in greater detail below. It should be readily apparent that while the system 100 illustrated in FIG. 1 includes only three client devices, the system may actually comprise more or less than three client devices, and three have been shown and described for simplicity. Each thin client device 110-130 may be accessed and operated by, for example, a user (not shown in FIG. 1).

In one implementation, the client-server model may be a distributed application structure that partitions tasks or workloads between the providers of a resource or service, called servers (e.g., the server 150), and service requesters, called clients (e.g., thin client devices 110, 120 and 130). The thin client devices 110-130 may be any computer devices that can connect to a server (e.g., the server 150) to process operations for the user. For example, a thin client device can be an electronic device such as a computer, a mobile phone, a laptop computer, a thin client device, a personal digital assistant (PDA), a portable computing device, or a suitable device with a processor.

Such a computer device typically can include a processor, memory, a network interface, and graphical capabilities. In one example, the thin client devices 110-130 may be low-end computer terminals, laptops, thin clients. ATM machines, smart phones, etc. For another example, the thin client devices 110-130 may be devices configured and/or manufactured to be used specifically as thin clients. The thin client devices 110-130 may initiate communication sessions with the server 150 which await incoming requests. In some implementations, the thin client devices 110-130 may be connected to a virtual desktop running on the server 150 that is operatively or physically coupled to the thin client devices 110-130. In such implementations, the thin client devices 110-130 may be connected to the virtual desktop via, for example, remote desktop software.

The user may be a person that uses the thin client devices 110-130 to perform an operation (e.g., a client, an operator, a network administrator, or the like). In one implementation, multiple users can operate at separate thin client devices 110-150 at the same time. Similarly stated, the server device 150 can concurrently handle multiple operations requested from multiple users operating on the thin client devices 110-130. In some implementations, the server device 150 may be configured to divide its time and the power of its resources among each user's session, such that requested operation from each thin client device 110-130 can be processed in a timely manner.

The network 140 can be any type of network that can operatively couple a thin client device (e.g., the thin client devices 110-130) and a server device (e.g., the server 150). The network 140 can be, for example, a wide area network (WAN), a wireless local area network (WLAN), a campus area network (CAN), the Internet, etc. In some embodiments, a thin client device (e.g., the thin client devices 110-130) can communicate with the server 150 through the network 140. In such implementations, routers and/or switches may be used. For example, the routing devices within the network 140 can forward and/or switch the traffic between the thin client device 110, 120 or 130 and the server 150. In one implementation, a thin client device may be directly connected to the server 150. In such implementation, the thin client device can directly communicate with the server 150.

The network 140 to which the thin client device 110, 120 and 130 are connected may require a plurality of session services, including Citrix Independent Computing Architecture (ICA), which can be made available on the network using Presentation Server, XenDesktop, or XenApp for Microsoft Windows 2000/2003/2008 Server family. Another session service that may be required in the network 140 may be Microsoft Remote Desktop Protocol (RDP).

In one implementation, the thin client devices 110-130 may have device managers, which allow the user to view the thin client assets remotely and to manipulate those thin clients to meet the required business need. The device managers may allow the user to track, configure, upgrade, clone, and manage thousands of individual devices from a centralized location.

The thin client devices 110-130 may have configuration managers. In one implementation, a user may also be able to create an image configuration of their choice by using a configuration application. Alternatively or in addition, a server administrator may also be able to create an image configuration of their choice by exporting an already configured image (via OS). More specifically, one objective of configuration management is for information technology (IT) administrators to easily configure their Windows based thin clients and get them configured for their users in the least amount of time possible. In addition, the configuration managers may prompt the user to provide input to customize the operation image. Once a customized thin client image is prepared, the system may use centralized management tools (e.g., HP Device Manager) to capture, clone and deploy that customized image across the thin clients.

Moreover, a configuration manager may be able to push updated configurations to an already configured device. In one implementation, these updates may be subsets of a full configuration. When pushing updated configurations, only those settings that are part of the update may change without changing the overall state of the device. In some aspects, configurations being pushed on thin clients may also be able to reset (e.g., delete) the existing configuration on the thin clients and then apply the new configurations.

The server 150 may be a host running one or more server programs which share their resources with clients. The server 150 may be any device that is capable of connecting to, and controlling and/or facilitating the operations (e.g., booting) of one or more thin client devices (e.g., the thin client devices 110-130). The server 150 can be configured to provide various services (e.g., a computing service, a communication service, a processing service, etc.) and process requested operations received from a thin client device operatively coupled to the server 150. The server 150 can be, for example, a computer server, a desktop computer, a laptop computer, a personal digital assistant (FDA), or the like. In some implementations, the server 150 may be a physical or virtual server that hosts one or more virtual machines providing virtual desktops for the thin client devices (e.g., the thin client devices 110-130). In some implementations, the server 150 may include or provide services to download configuration or boot files to a thin client device, etc.

In some implementations, the server 150 may host or include multiple thin client operating system images that can be provided to thin client devices that are operatively coupled to the server 150. More specifically, a thin client operating system image may be a file or file-system that contains a thin client operating system, executable programs, and/or any additional data files related to the thin client operating system and executable programs. In some implementations, the server 150 may include network file systems and remote desktop service, which may be included in a thin client operating system image.

The server 150 may include one or more hardware-based and/or software-based modules (executing in hardware and/or stored in memory) that are capable of performing various functions associated with a thin client device. Such functions can include, for example, booting the thin client device, assigning and sending an IP address to the thin client device, running a virtual desktop associated with the thin client device, executing virtual desktop applications associated with the thin client device, etc.

In one implementation, the thin client device 110-130 may include a network interface card, through which the thin client device 110-130 can communicate with the server 150 via, for example, the network 140.

In some implementations, each thin client device 110, 120 or 130 may include a display device or component (e.g., a monitor), and a communication device or component to communicate with the server 150 (e.g., a network interface card (NIC)). In one example, the display may present various pages that represent applications available to the user. A user interface on the display may facilitate interactions between the user and the associated thin client device (e.g., the thin client device 110, 120 or 130) by inviting and responding to user input and translating actions (e.g., tasks) and results to a language or image that the user can understand. In one implementation, consistent with the present disclosure, the display may be a part of the thin client device. In another implementation, the display may be a stand-alone unit, separate from the thin client device. In such implementation, the display may be connected to the thin client device through any type of interface or connection, including I2C, SPI, PS/2, Universal Serial Bus (USB), Bluetooth, RF, IRDA, keyboard scan lines or any other type of wired or wireless connection to list several non-limiting examples.

In another implementation, the thin client devices 110-130 may receive input from a plurality of input devices, such as a keyboard, mouse, touch device, or verbal command. In some implementations, the user may interact with the thin client device 110, 120 or 130 by controlling a keyboard, which may be an input device for the device. For example, the user may perform various gestures on the keyboard. Such gestures may involve, but not limited to, touching, pressing, waiving, placing an object in proximity. Using an input device, a user can interact with a thin client device 110, 120 or 130, entering data and instructions, which can then be transmitted to the server 150. For example, the system 100 may request a users input to customize the operating system image through the display device, and the user may provide the input using the keyboard.

In one implementation, the system 100 may have a timer associated with a client device (e.g., timer 160 associated with the client device 110, timer 170 associated with the client device 120, and timer 180 associated with the client device 130). The timer may be used to track the time between the system 100's request for information from the user and the user's actual response if the user chooses to respond. The system may have a predetermined threshold for such time. For example, the threshold value may be five minutes, and the timer may track the time for 5 minutes. If no input from the user is detected within five minutes, the timer stops, and the system 100 proceeds to initiate the appropriate step (e.g., start automatic set-up). If an input from the user is received before the time reaches the predetermined threshold, the system 100 proceeds to implement the input from the user. It should be noted that this predetermined threshold may be identified by the manufacturer of the thin client devices 110-130 as a default setting. The value may vary from device to device. For example, the thin client device 110 may have a different threshold value than the thin client device 120. In another implementation, the predetermined threshold may be adjusted by an administrator of the server 150. In a further implementation, the threshold value may be adjusted a plurality of times depending on the user of the associated thin client device. In one implementation, the timer may be located in the thin client device that it is associated with (e.g., the client device 110, 120 or 130). In another implementation, the timer may be located as a stand-alone unit.

Figure 2:
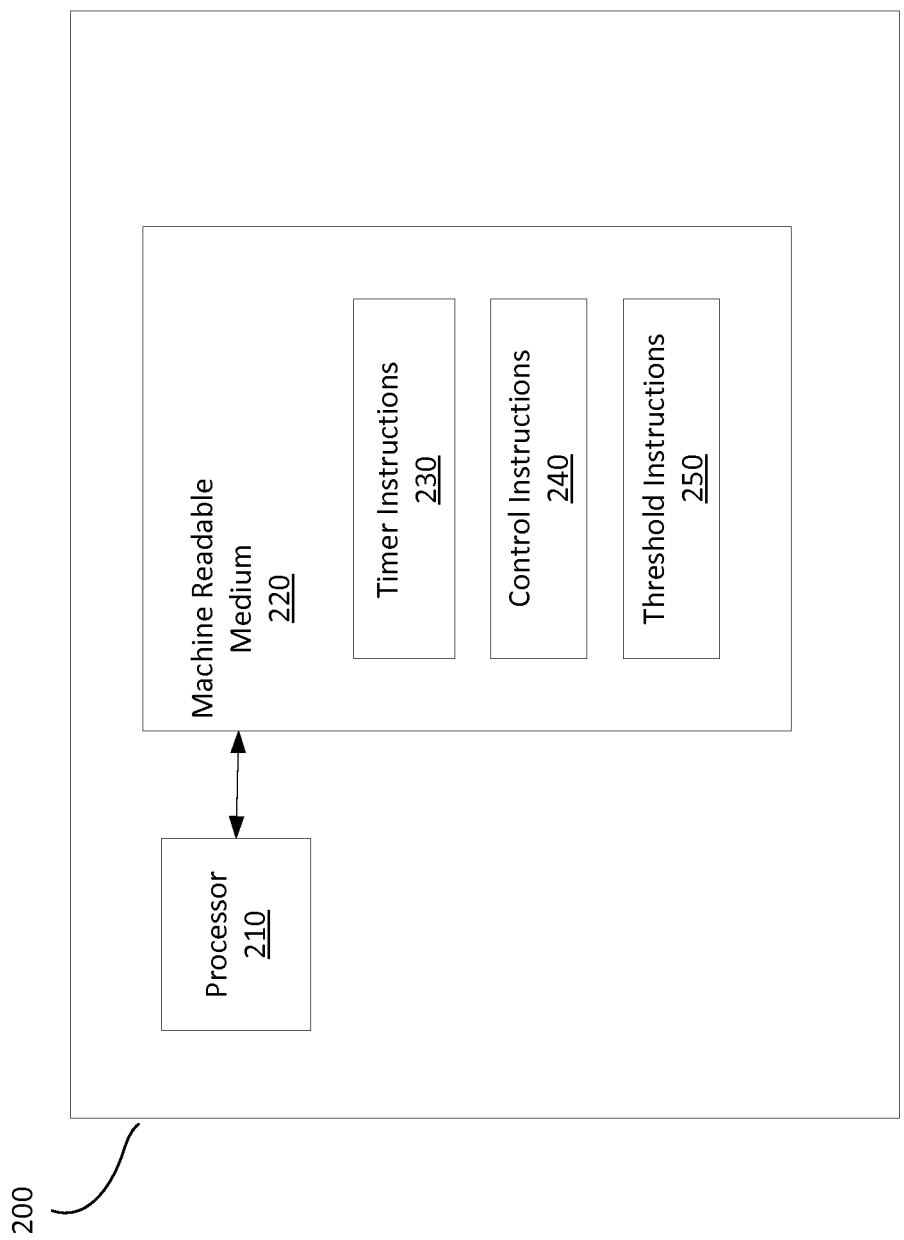
FIG. 2 illustrates example components of an example system in accordance with an implementation.

FIG. 2 illustrates a block diagram illustrating an example of a hardware structure of the system 200 in accordance with an implementation. The system 200 provides a more detailed illustration of the components of the system 100 of FIG. 1. More specifically, the system 200 comprises a processor 210 and a machine readable medium 220, each of which is described in greater detail below. The machine readable medium 220 comprises timer instructions 230, control instructions 240 and threshold instructions 250. It should be readily apparent that the system 200 illustrated in FIG. 2 represents a generalized depiction and that other components may be added or existing components may be removed, modified, or rearranged without departing from a scope of the present disclosure.

In one implementation, the processor 210 may be in data communication with the computer readable medium 220. The processor 210 may retrieve and execute instructions stored in the computer readable medium 220. The processor 210 may be, for example, a central processing unit (CPU), a semiconductor-based microprocessor, an application specific integrated circuit (ASIC), a field-programmable gate array (FPGA) configured to retrieve and execute instructions, other electronic circuitry suitable for the retrieval and execution instructions stored on a computer readable storage medium, or a combination thereof. The processor 210 may fetch, decode, and execute instructions stored on the storage medium 220 to operate the device in accordance with the above-described examples. The computer readable medium 220 may be a non-transitory computer-readable medium that stores machine readable instructions, codes, data, and/or other information. In certain implementations, the computer readable medium 220 may be integrated with the processor 210, while in other implementations, the computer readable medium 220 and the processor 210 may be discrete units.

In one implementation, the computer readable medium 220 may include program memory that includes programs and software such as an operating system, user detection software component, and any other application software programs. Further, the computer readable medium 220 may participate in providing instructions to the processor 210 for execution. The computer readable medium 220 may be one or more of a non-volatile memory, a volatile memory, and/or one or more storage devices. Examples of non-volatile memory include, but are not limited to, electronically erasable programmable read only memory (EEPROM) and read only memory (ROM). Examples of volatile memory include, but are not limited to, static random access memory (SRAM) and dynamic random access memory (DRAM). Examples of storage devices include, but are not limited to, hard disk drives, compact disc drives, digital versatile disc drives, optical devices, and flash memory devices.

In one implementation, the machine readable storage medium (media) may have instructions stored thereon/in which can be used to program the computer 200 to perform any of the processes of the embodiments described herein. The timer instructions 230 can cause the processor 210 to provide the device with various rules for utilizing the time data generated by the timer. For example, the rules may determine how the thin client device handles the time measurement (e.g., whether or not the device changes a function or setting in response to measuring a certain amount of time). More specifically, the timer instructions may initiate the timer when the system requests input from a user of the system. The timer continues tracking time for a predetermined period or until the user provides input before the predetermined period of time is reached. In one implementation, the timer may be reset upon the condition that a response from the user has not been received for a specified time (e.g., five minutes). For example, it may be determined that the measured period of time (e.g., the time tracked by the timer) is equal to or greater than the predetermined period of time. Therefore, the timer may stop and the device may be required to proceed with the standard/pre-determined settings for the operation image.

The control instructions 240 can cause the processor 210 (more specifically, a controller in the processor 210) to process the timer data captured by a timer. The controller may also be used to respond to the detection of the input from the user. For example, the device may initiate a request to capture data from the user. In response to that event, the control instructions 240 may issue a command to the timer to start tracking the time.

The threshold instructions 250 can cause the processor 210 to determine whether the threshold value may be adjusted. In one example, the threshold value may vary based on the user (e.g., first time user, experienced user). In another example, the threshold value may vary based on the user profile (e.g., IT employee, non-technology person). In a further example, the threshold value may vary depending on the device's power setup (e.g., plugged in or battery). Alternatively or in addition, the processor 210 may provide a way for a user to interact with the system 200 to modify the timer settings.

Figure 3:
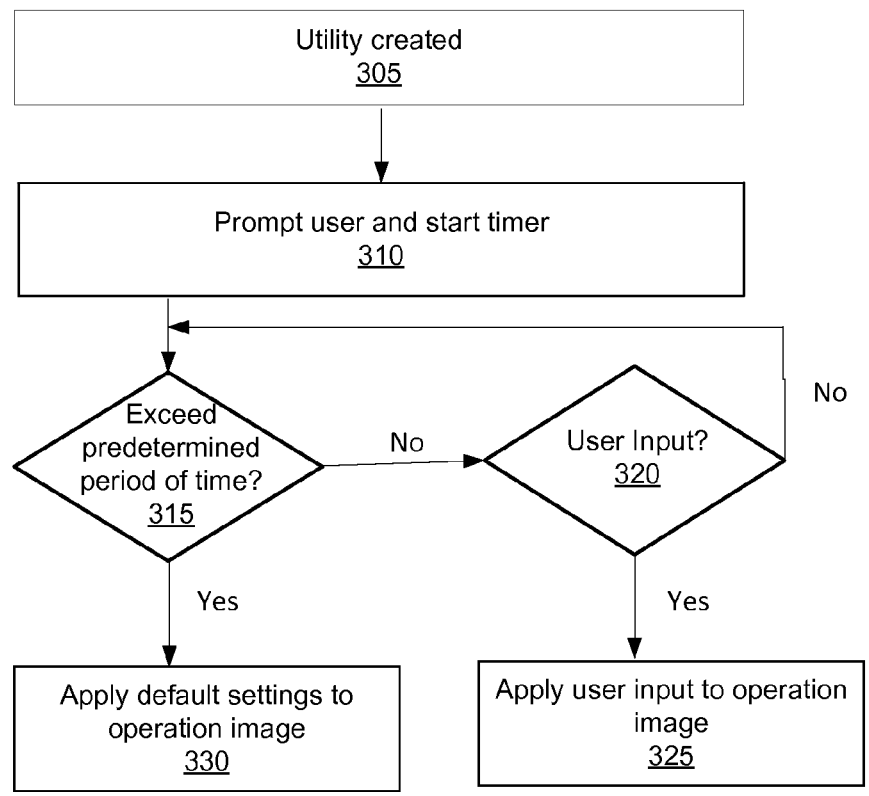
FIG. 3 illustrates an example process flow diagram in accordance with an implementation.

Turning now to the operation of the system 100, FIG. 3 illustrates an example process flow diagram 300 in accordance with an implementation. It should be readily apparent that the processes illustrated in FIG. 3 represents generalized illustrations, and that other processes may be added or existing processes may be removed, modified, or rearranged without departing from the scope and spirit of the present disclosure. Further, it should be understood that the processes may represent executable instructions stored on memory that may cause a processor to respond, to perform actions, to change states, and/or to make decisions. Thus, the described processes may be implemented as executable instructions and/or operations provided by a memory associated with a system 100. Alternatively or in addition, the processes may represent functions and/or actions performed by functionally equivalent circuits like an analog circuit, a digital signal processor circuit, an application specific integrated circuit (ASIC), or other logic devices associated with the system 100. Furthermore, FIG. 3 is not intended to limit the implementation of the described implementations, but rather the figure illustrates functional information one skilled in the art could use to design/fabricate circuits, generate software, or use a combination of hardware and software to perform the illustrated processes.

The process 300 may begin at block 305, where a utility is created to perform a very specific task of customizing an operation image relating to managing system resources and executed on first boot. More specifically, the system program is started and executed in accordance with key input signals from the input device, and application response signals and screen update information received from the server apparatus through the communication interface.

At block 310, the utility prompts a user to provide input to customize the settings of the operation image. At block 315, the system determines if the time exceeds the predetermined amount of time (e.g., five minutes). The predetermined amount of time identifies the specified magnitude of time measurement which may be any suitable measurement of time for which the system may trigger a responsive action. The predetermined period of time may be defined by the manufacturer of the system, the user of the system or by any other suitable mechanism.

If the predetermined amount of time has not been reached, at block 320 the system proceeds to determine whether the user input is detected. In the event that no user input is detected, the system goes back to block 315 and continues to check whether the time exceeds the predetermined amount of time (e.g., five minutes). In the event that an input from the user is detected, at block 325, the system proceeds to stop the timer, and customize the operation image based on the input received from the user. In one implementation, the user may specify the time zone the user prefers the operation to run in, and accordingly, the system incorporate this preference in the settings of the operation image.

If the predetermined amount of time has been reached, at block 330, the system proceeds to reset the time and initiate the set-up of the operation image based on default settings. As discussed above in reference to FIG. 1, the default settings may be determined by the manufacturer of the system.

The present disclosure has been shown and described with reference to the foregoing exemplary implementations. It is to be understood, however, that other forms, details, and examples may be made without departing from the spirit and scope of the disclosure that is defined in the following claims. As such, all examples are deemed to be non-limiting throughout this disclosure.

What is claimed is:

1. A method, comprising:
   executing a utility program upon an initial start-up of a thin-client device;
   prompting, by the utility program, a user for input to modify a group of configuration settings for a single operation image installed in the thin-client device;
   if the input is detected within a predetermined period of time:
      modifying, by the utility program, the group of configuration settings for the single operation image based on the input to create a customized operation image that is stored for later use,
      cloning the customized operation image to create cloned operation images, and
      deploying the cloned operation images to multiple thin-client devices; and
   if the input is not detected within the predetermined period of time, proceeding with default values of the group of configuration settings for the single operation image.

2. The method of claim 1, wherein the predetermined period of time is preconfigured by a manufacturer of the thin-client device.

3. The method of claim 1, wherein the predetermined period of time is configurable by the user.

4. The method of claim 1, further comprising receiving the input from the user.

5. The method of claim 1, wherein the predetermined period of time varies based on a profile of the user of the thin-client device.

6. The method of claim 1, further comprising deactivating the timer and terminating the utility program by entering a command specified by a manufacturer of the thin-client device.

7. The method of claim 1, wherein the group of configuration settings is selected by a manufacturer of the thin-client device.

8. The method of claim 1, wherein the group of configuration settings comprises time zone selection and language selection.

9. The method of claim 4, wherein the user enters the input on an input device of the thin-client device.

10. The method of claim 4, wherein the user uploads a file to specify the input, the file having preselected settings to customize the operation image.

11. A thin-client device, comprising:
    a timer; and
    a processing unit communicatively coupled to the timer to:
       execute a utility program upon an initial start-up of the thin-client device;
       prompt, by the utility program, a user for input to modify a group of configuration settings for a single operation image installed in the thin-client device;
       if the input is detected within a predetermined period of time:

modify, by the utility program, the group of configuration settings for the single operation image based on the input to create a customized operation image that is stored for later use, clone the customized operation image to create cloned operation images, and deploy the cloned operation images to multiple thin-client devices; and if the input is not detected within the predetermined period of time, proceed with default values of the group of configuration settings for the single operation image.

12. The thin-client device of claim 11, wherein the processing unit comprises a controller to determine the action to be performed on the timer.

13. The thin-client device of claim 11, further comprising a display unit coupled to the processing unit, to present requests for input to a user.

14. The thin-client device of claim 13, wherein the requests for input are removed on the display unit if the input is not detected within the predetermined period of time.

15. The thin-client device of claim 11, wherein the predetermined selection is specified by a manufacturer of the thin-client device.

16. A non-transitory computer-readable medium comprising instructions that when executed cause a thin-client device to:

execute a utility program upon an initial start-up of the thin-client device;

prompt, by the utility program, a user for input to modify a group of configuration settings for a single operation image installed in the thin-client device;

obtain, by the utility program, a timer reading when the input is received;

compare, by the utility program, the timer reading to a threshold value;

modify, by the utility program, the group of configuration settings for the single operation image based on the comparison to create a customized operation image that is stored for later use;

clone the customized operation image to create cloned operation images; and deploy the cloned operation images to multiple thin-client devices.

17. The non-transitory computer-readable medium of claim 16, wherein the utility program is to modify the group of configuration settings by applying default values of the group of configuration settings to the single operation image if the timer reading exceeds the threshold value.

18. The non-transitory computer-readable medium of claim 16, wherein the utility program is to modify the group of configuration settings by applying, to the group of configuration settings for the single operation image, a setting specified in the input from a user if the timer reading does not exceed the threshold value.

* * * * *